United States Patent
Hattori

(10) Patent No.: US 7,201,400 B2
(45) Date of Patent: Apr. 10, 2007

(54) THROUGH ANCHOR AND METHOD OF MANUFACTURE THEREOF

(75) Inventor: Yasunori Hattori, Aichi-ken (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 414 days.

(21) Appl. No.: 10/843,369

(22) Filed: May 12, 2004

(65) Prior Publication Data
US 2004/0227341 A1 Nov. 18, 2004

(30) Foreign Application Priority Data
May 14, 2003 (JP) .............. 2003-135564

(51) Int. Cl.
*B60R 22/18* (2006.01)
(52) U.S. Cl. .............. 280/801.1; 297/463.1; 297/482
(58) Field of Classification Search .......... 280/808, 280/801.1; 297/463.1, 482, 483, 468
See application file for complete search history.

(56) References Cited

U.S. PATENT DOCUMENTS

| | | | | |
|---|---|---|---|---|
| 4,102,020 A | * | 7/1978 | Lindblad | ............. 24/164 |
| 6,138,328 A | * | 10/2000 | Iseki | ............. 24/197 |
| 2001/0043006 A1 | | 11/2001 | Iseki | |
| 2002/0093185 A1 | | 7/2002 | Koketsu | |
| 2003/0015865 A1 | * | 1/2003 | Tomita et al. | ......... 280/808 |
| 2003/0020271 A1 | * | 1/2003 | Okubo | ......... 280/808 |

FOREIGN PATENT DOCUMENTS

| | | |
|---|---|---|
| DE | 91-10-443 U | 11/1991 |
| JP | 05-044719 | 6/1993 |
| JP | 2002-337658 | 11/2002 |

OTHER PUBLICATIONS

European Search Report Application No. EP 04 25 2744 dated Oct. 26, 2004.

* cited by examiner

*Primary Examiner*—David R. Dunn
(74) *Attorney, Agent, or Firm*—Roberts, Mlotkowski & Hobbes; Thomas W. Cole

(57) ABSTRACT

In a through anchor, a configuration of first grooves (or second grooves) of a region on a surface of a piece, which region is where a webbing is particularly strongly fit tightly to and slides when a vehicle rapidly decelerates (i.e., a region at a vehicle front side and a vehicle compartment inner side), runs along a direction of application of the webbing to a vehicle occupant, and is formed so as to smoothly curve toward a rear of the vehicle. Therefore, the webbing, which slides in a state of being strongly fit tightly to the first grooves (or the second grooves) on the surface of the piece, slides while a direction of sliding thereof is pulled back (corrected) toward the rear of the vehicle.

25 Claims, 12 Drawing Sheets

FRONT OF VEHICLE ← → REAR OF VEHICLE

F I G. 4
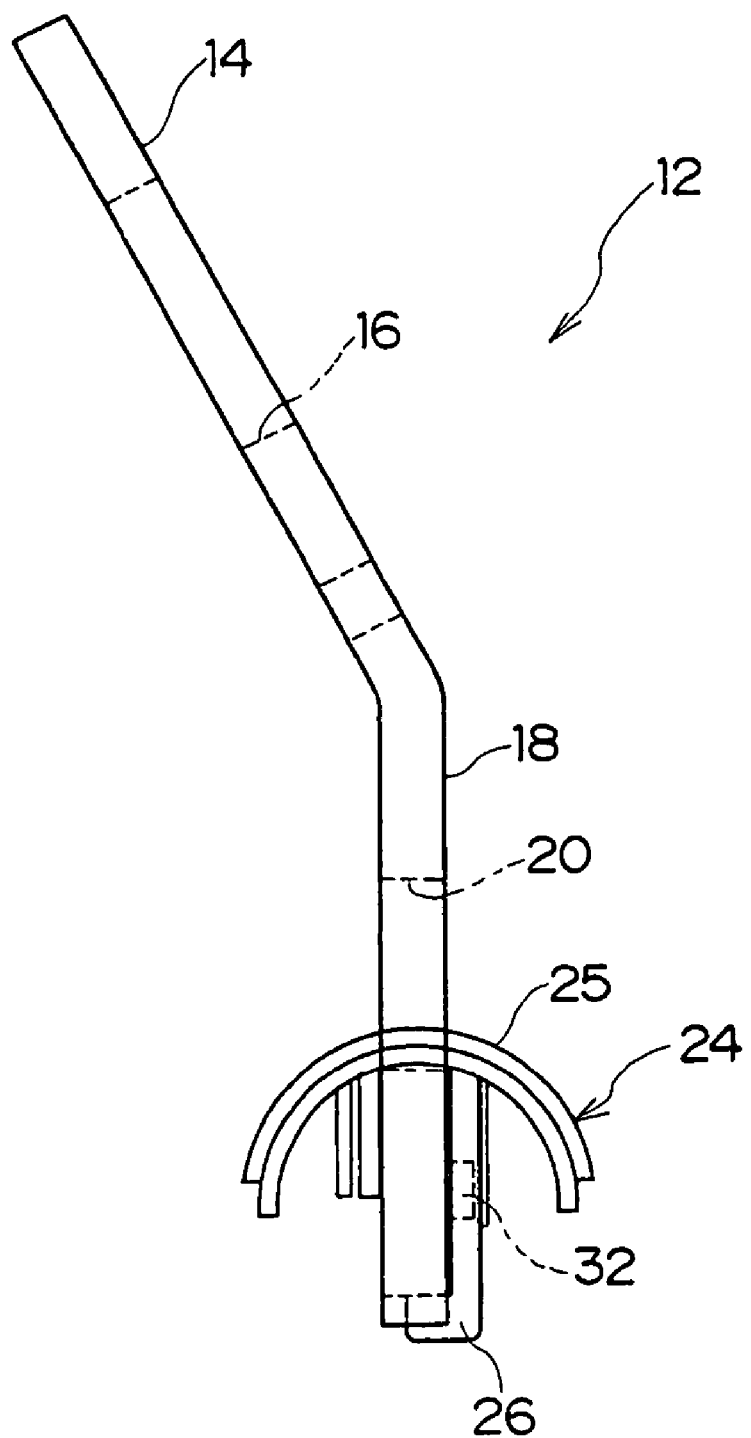

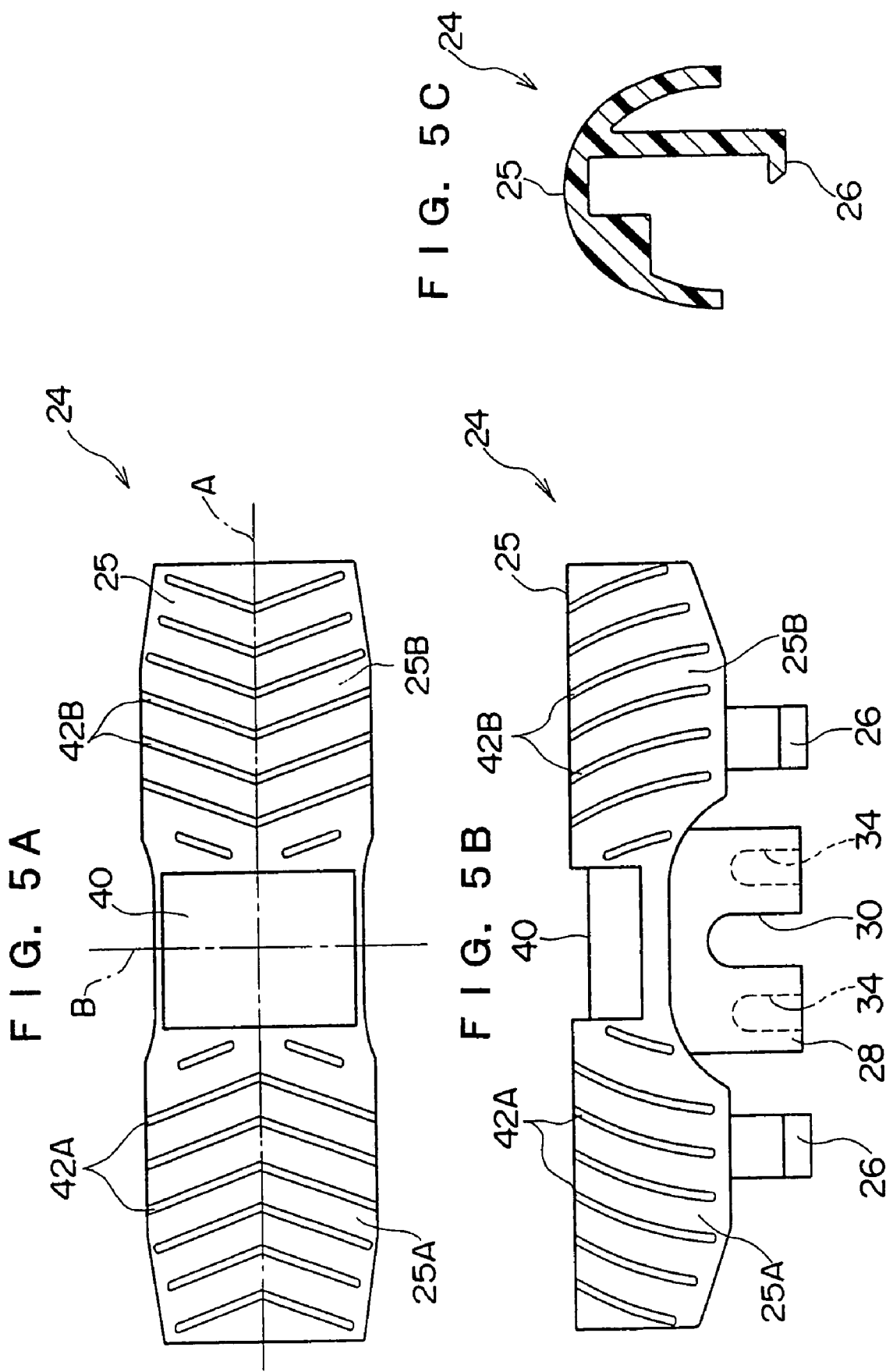

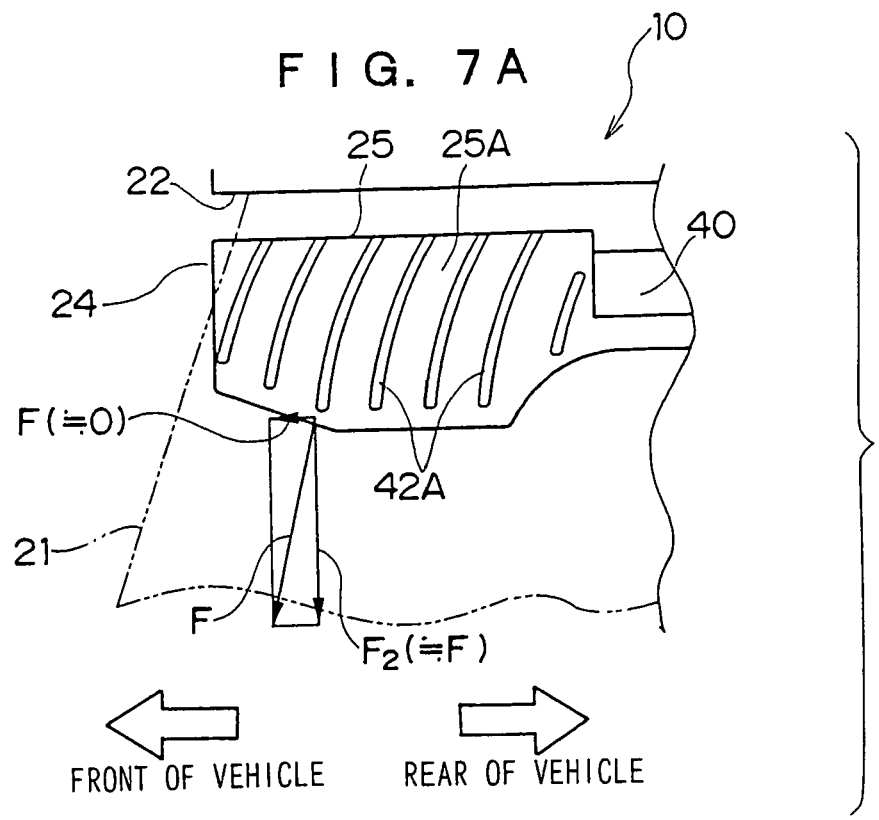
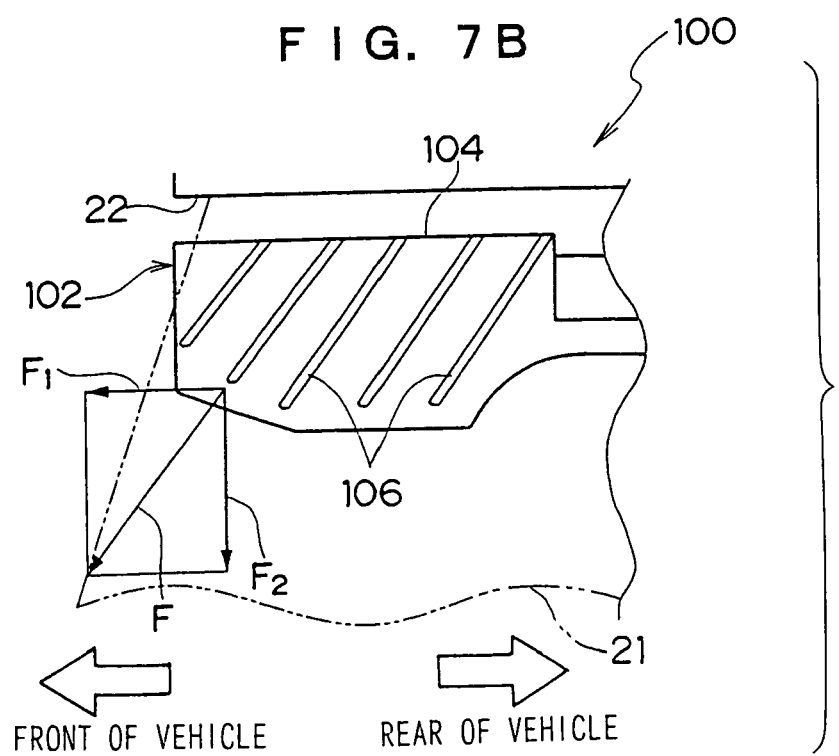

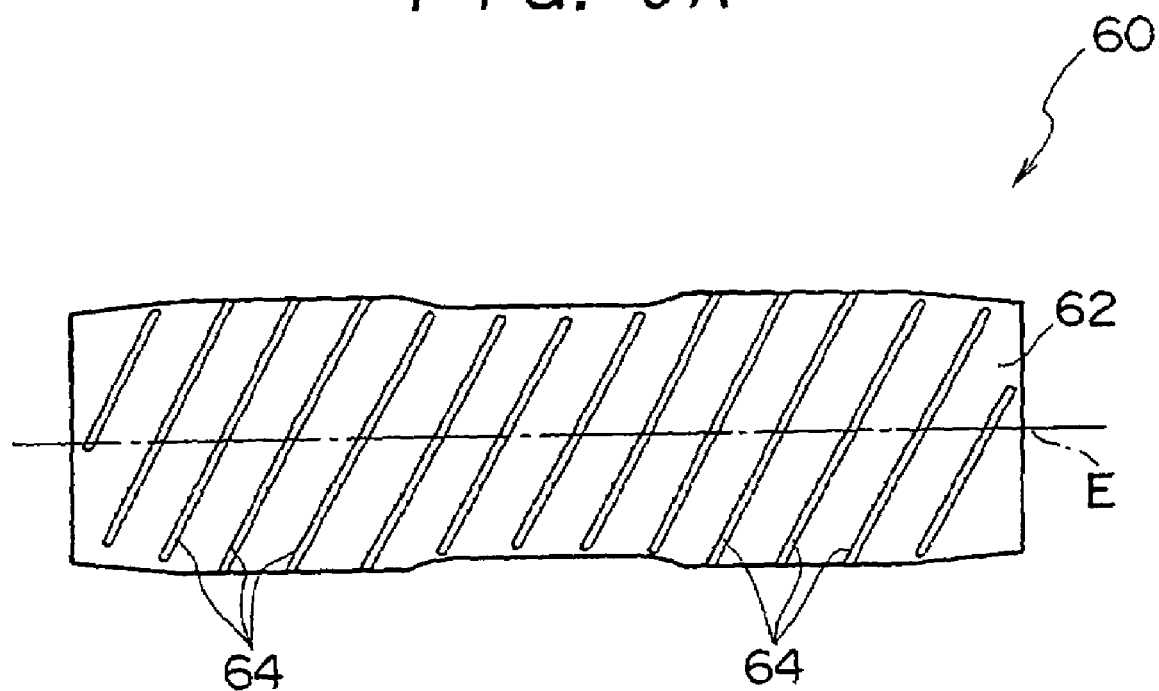
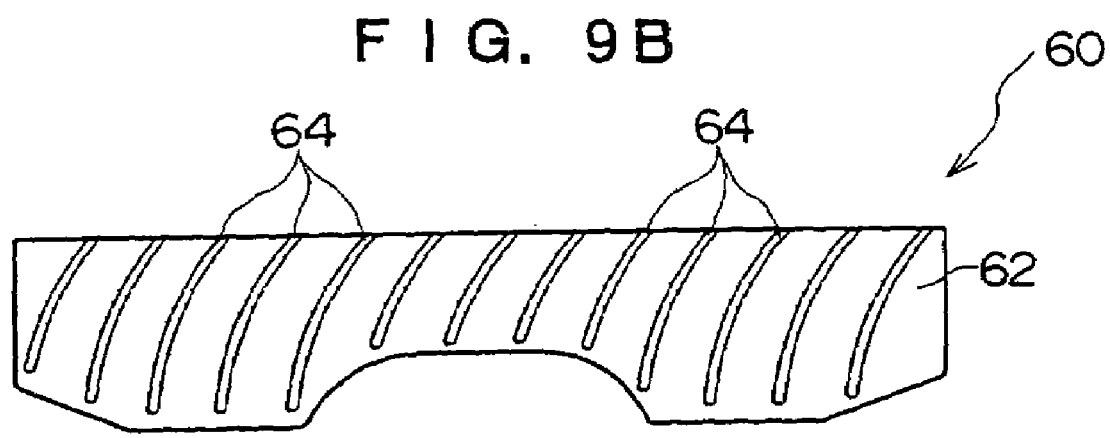

THROUGH ANCHOR AND METHOD OF MANUFACTURE THEREOF

CROSS-REFERENCE TO RELATED APPLICATION

This application claims priority under 35 USC 119 from Japanese Patent Application, No. 2003-135564, the disclosure of which is incorporated by reference herein.

BACKGROUND OF THE INVENTION

1. Field of the Invention

The present invention relates to a through anchor which is applied to a seat belt device for a vehicle, and around which a webbing for restraining a vehicle occupant is trained, and which supports the webbing at a vehicle body, and to a method of manufacturing the through anchor.

2. Description of the Related Art

A three point seat belt device using a continuous webbing is known as a seat belt device for a vehicle.

In this type of seat belt device, one end portion of the webbing is anchored at a retractor, and the other end portion of the webbing passes through a through anchor and is anchored to an anchor plate. When a vehicle occupant applies the webbing to himself/herself, he/she engages a tongue plate, which is disposed at an intermediate portion of the webbing between the anchor plate and the through anchor, with a buckle device. The webbing is thereby pulled out from the retractor and set in a state of being applied to the vehicle occupant.

The through anchor, around which the webbing is trained and which is for supporting the webbing at the vehicle body as described above, is generally structured such that a resin material is integrally molded with a metal main body portion (a metal plate). In this way, the edge portions and the like of the metal main body portion are covered and are not exposed to the exterior. Moreover, in such a through anchor, in order for the webbing to be drawn-out and taken-up smoothly, a structure is known in which a resin piece, which is formed of a synthetic resin material such as polyacetal or high molecular weight polyethylene or the like, is fixed to the portion of the through anchor along which the webbing slides, so as to decrease the coefficient of friction with the webbing.

However, in a through anchor having the above-described structure, when a large load is applied to the webbing at the time when the vehicle rapidly decelerates, because the coefficient of friction of the resin piece is low, there are cases in which the webbing slips laterally within the insert-through hole and moves toward and gets stuck at one end of the insert-through hole, such that so-called jamming occurs.

Thus, the forming of plural grooves in the surface of the resin piece is know as a means for preventing jamming while ensuring good slidability of the webbing (see, for example, Japanese Utility Model Application Laid-Open (JP-U) No. 1993-44719).

However, in the through anchor disclosed in JP-U No. 1993-44719, the grooves in the surface of the resin piece are formed in a direction which is inclined toward the front of the vehicle with respect to the direction orthogonal to the width direction of the webbing (i.e., the grooves are formed in a direction orthogonal to the width direction of the webbing at the time when the webbing is in its state of usual application to the body of the vehicle occupant). Accordingly, there are cases in which the webbing slips laterally toward the front of the vehicle within the insert-through hole due to the component of force, which is directed toward the front of the vehicle, of the force applied from the grooves to the webbing, and jamming cannot be reliably suppressed.

SUMMARY OF THE INVENTION

The present invention is conceived of in consideration of the above-described circumstances. The present invention is to provide a through anchor which can reliably prevent jamming while ensuring good slidability of a webbing, and a method of manufacturing the through anchor.

A first aspect of the present invention is a through anchor for supporting, at a vehicle, a webbing for restraining a vehicle occupant, the through anchor including, a main body portion which is formed of metal, and in which is formed an insert-through hole through which the webbing is inserted, a piece that is assembled to a peripheral edge of the insert-through hole of the main body portion and structuring a portion of the insert-through hole, a surface of the piece being a region around which the webbing is trained, and the piece having plural grooves in the surface, and a covering portion that is molded, together with the piece, integrally at a periphery of the insert-through hole of the main body portion, and covering the corresponding region, wherein, among the grooves of the surface of the piece, at least the configurations of the grooves at a region which is disposed at a front side of the vehicle and at an inner side of a vehicle compartment run along a direction of application of the webbing to a vehicle occupant and are formed so as to smoothly curve toward a rear of the vehicle.

In the through anchor of the first aspect, the piece is assembled to a peripheral edge of the insert-through hole formed in the metal main body portion, and structures a portion of the insert-through hole. The covering portion is, together with the piece, integrally molded to the periphery of the insert-through hole of the main body portion. By attaching this through anchor either directly or indirectly to a predetermined position within a vehicle (e.g., a center pillar or the like), the longitudinal direction intermediate portion of the webbing, which is inserted through the insert-through hole of the main body portion, is supported while being trained around the surface of the piece. Accordingly, because the webbing slides along the surface of the piece at the time of pulling-out or taking-up the webbing, the pulling-out or taking-up of the webbing can be carried out smoothly.

The plural grooves are formed in the surface of the piece. Therefore, for example, when inertial force directed toward the front of the vehicle is applied to the body of the vehicle occupant in a state in which the vehicle rapidly decelerates and pulling-out of the webbing is locked by a webbing retractor, the webbing trained around the surface of the piece slides in a state of being tightly fit against the plural grooves of the surface of the piece.

In particular, when a very large load is applied to the webbing, the webbing slides in a state of being strongly fit tightly to the grooves at the region of the surface of the piece, which region is disposed at the front of the vehicle and at the vehicle compartment inner side (the vehicle occupant side). Therefore, the direction of sliding of the webbing is restricted (guided) by the grooves at this region.

Here, in the present through anchor, the configurations of at least the grooves at the region of the surface of the piece, which region is disposed at the front side of the vehicle and at the inner side of a vehicle compartment, run along the direction of application of the webbing to the vehicle occupant and are formed so as to smoothly curve toward the rear of the vehicle. Therefore, the webbing, which is sliding while being guided by the grooves of the surface of the piece, slides while the direction of sliding thereof is pulled to return (corrected) toward the rear of the vehicle. (In other words, the grooves are formed such that, in the force which the webbing receives from the grooves of the surface of the piece, only a slight component of force directed toward the front of the vehicle is generated.) Accordingly, the present through anchor can reliably prevent lateral slippage of the webbing toward the front of the vehicle in the insert-through hole at the time when the vehicle rapidly decelerates.

In this way, the through anchor of the first aspect can reliably prevent jamming while ensuring good slidability of the webbing.

A method of manufacturing a through anchor of a second aspect of the present invention is a method of manufacturing a through anchor which is for supporting, at a vehicle, a webbing for restraining a vehicle occupant. The method includes, fabricating a main body portion which is formed of metal and has a through hole, fabricating a piece having a surface around which the webbing is trained, forming plural grooves, which run along a direction of application of the webbing to a vehicle occupant and which smoothly curve toward a rear of the vehicle, at least at a region of the surface of the piece which region is disposed at a front side of the vehicle and at an inner side of a vehicle compartment, assembling the piece to a peripheral edge of the through hole of the main body portion, and molding a covering portion, together with the piece, the covering portion covering the corresponding region, integrally to a periphery of the through hole of the main body portion, so as to form an insert-through hole through which the webbing is inserted.

BRIEF DESCRIPTION OF THE DRAWINGS

FIG. 4 is a side view showing the structures of the piece and the main body portion of the through anchor relating to the embodiment of the present invention.

FIG. 5A is a top view showing the structure of the piece of the through anchor relating to the embodiment of the present invention.

FIG. 5B is a front view showing the structure of the piece of the through anchor relating to the embodiment of the present invention.

FIG. 5C is a side view showing the structure of the piece of the through anchor relating to the embodiment of the present invention.

FIG. 7A is a view for showing a comparison of the through anchor relating to the embodiment of the present invention and a conventional through anchor, and is a front view showing a state in which tension is applied to a webbing trained around the piece of the through anchor relating to the present embodiment.

FIG. 7B is a view for showing a comparison of the through anchor relating to the embodiment of the present invention and the conventional through anchor, and is a front view showing a state in which tension is applied to a webbing trained around a piece of the conventional through anchor.

FIG. 9A is a top view showing a second modified example of the piece of the through anchor relating to the embodiment of the present invention.

FIG. 9B is a front view showing the second modified example of the piece of the through anchor relating to the embodiment of the present invention.

FIG. 1B is a front view showing the fourth modified example of the piece of the through anchor relating to the embodiment of the present invention.

DETAILED DESCRIPTION OF THE INVENTION

Figure 1:
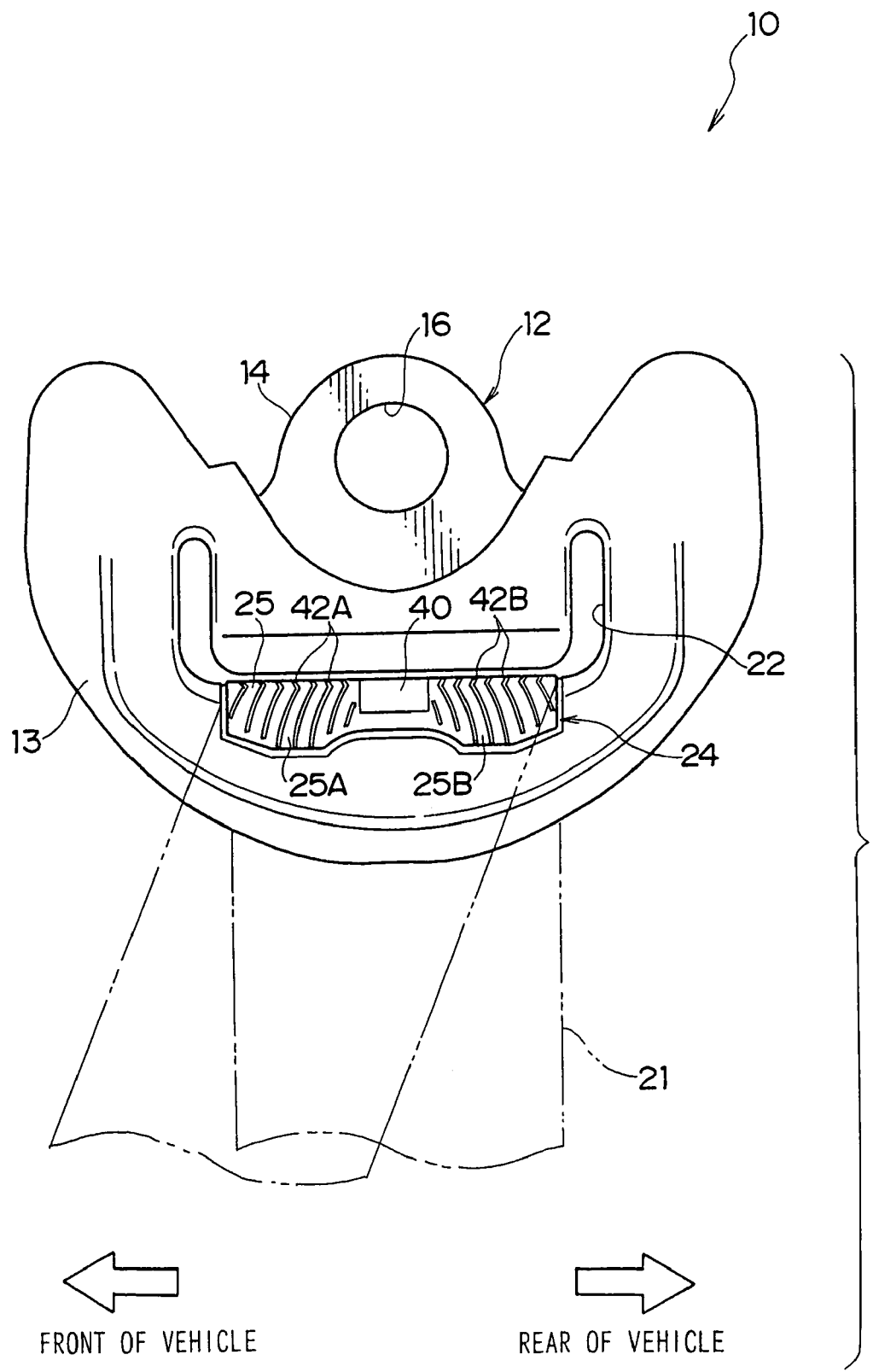
FIG. 1 is a front view showing the overall structure of a through anchor relating to an embodiment of the present invention.
Figure 2:
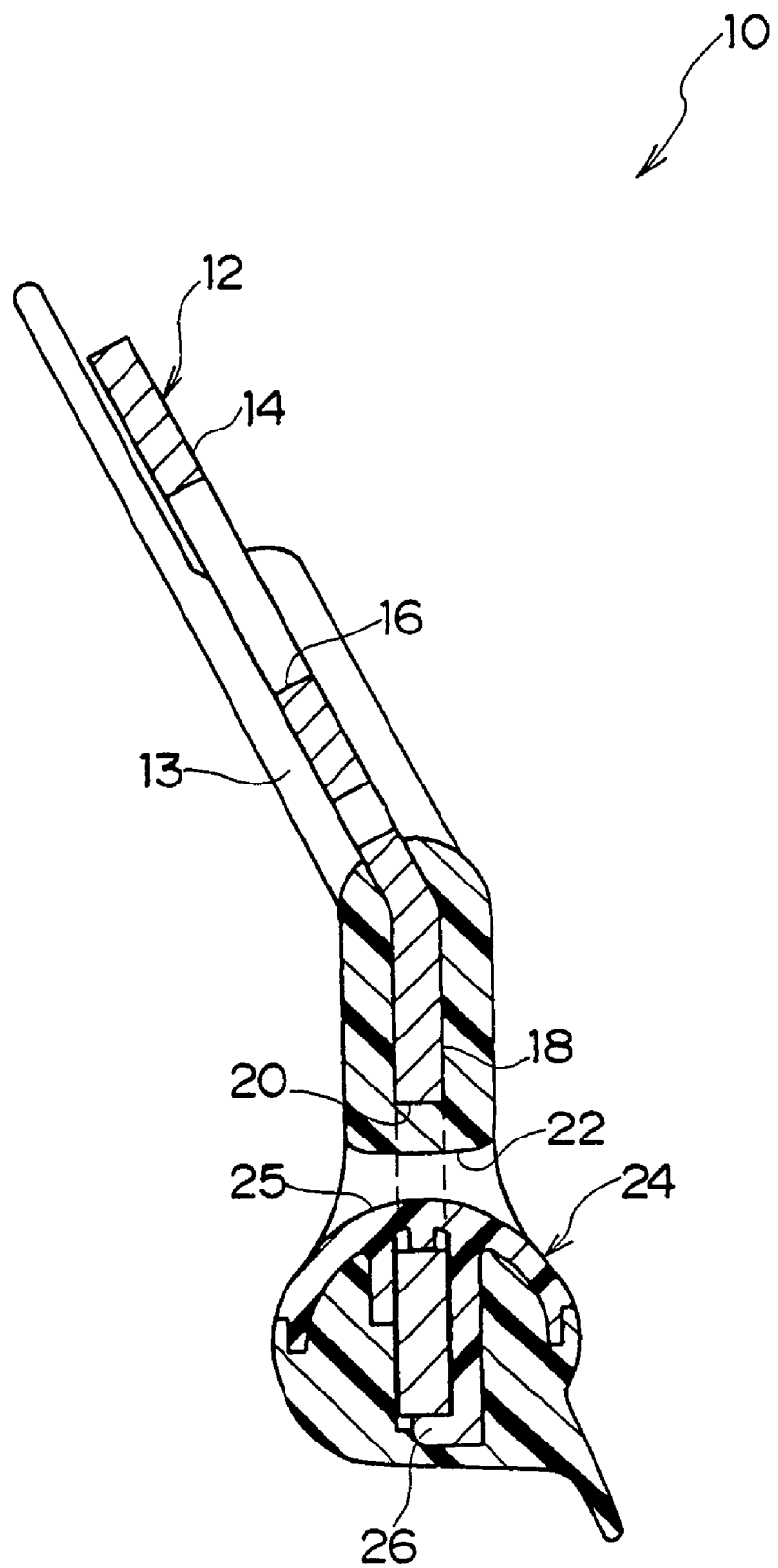
FIG. 2 is a sectional view showing the overall structure of the through anchor relating to the embodiment of the present invention.

The structure of a through anchor 10 relating to an embodiment of the present invention is shown in a perspective view in FIG. 1. A sectional view of the through anchor 10 relating to the embodiment of the present invention is shown in FIG. 2. Note that, the "up-down direction" and the "left-right direction" used in the following description express the directionality in the state in which the through anchor 10 is mounted to a vehicle.

Figure 3:
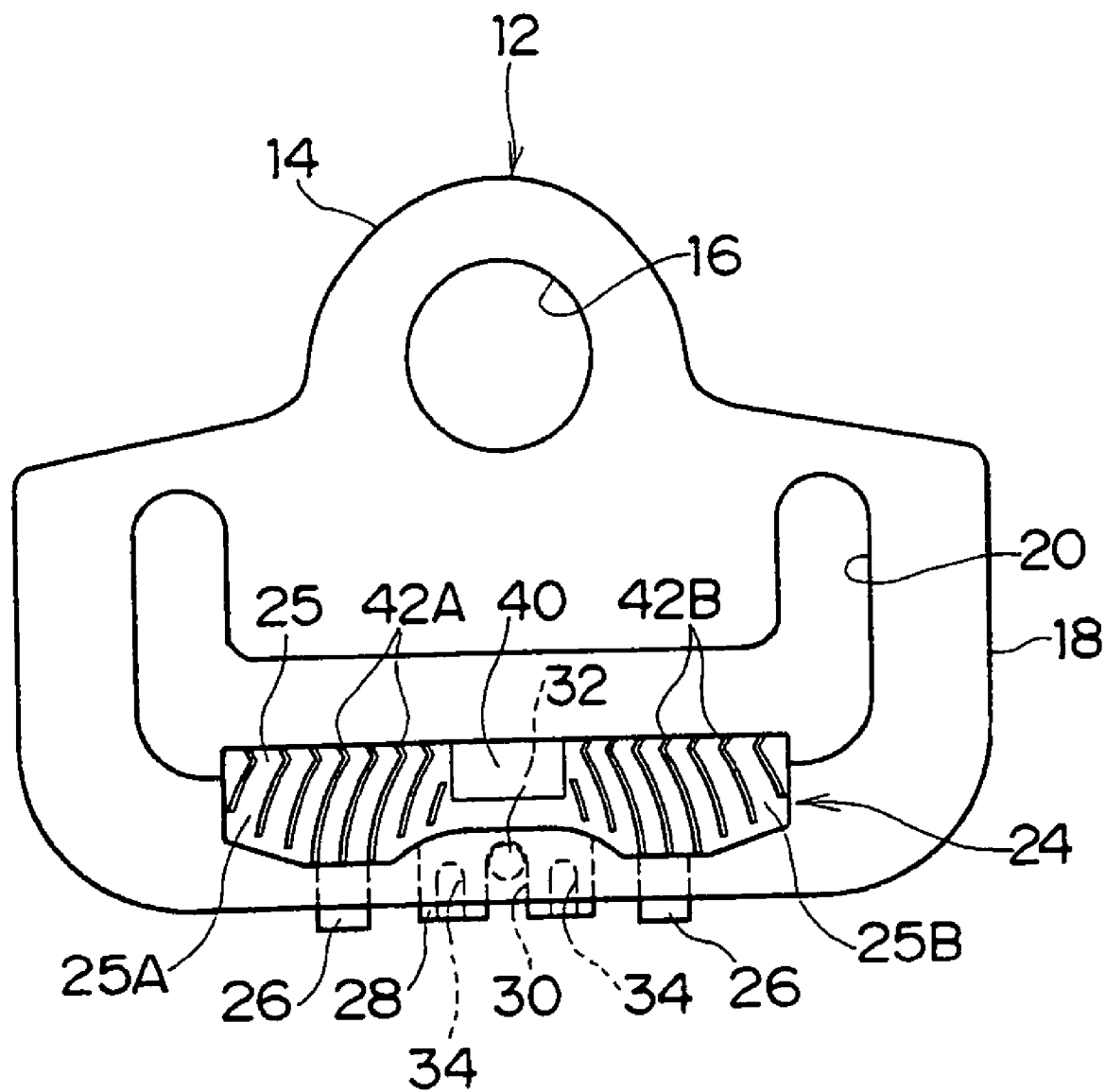
FIG. 3 is a front view showing the structures of a piece and a main body portion of the through anchor relating to the embodiment of the present invention.

As shown in these drawings, the through anchor 10 has a metal main body portion 12, and a covering portion 13 which is formed of resin and is molded integrally with the main body portion 12. A front view of the main body portion 12 is shown in FIG. 3, and a side view of the main body portion 12 is shown in FIG. 4.

The main body portion 12 is formed of a metal and overall in the shape of a plate, and is bent in a substantial V shape as seen in side view. A substantially semicircular base portion 14 is formed at the upper side of the main body portion 12. A circular hole 16, which passes through in the direction of thickness of the base portion 14, is formed in the base portion 14. An unillustrated mounting bolt passes through the circular hole 16. The mounting bolt is fixed to a center pillar of the vehicle or to a slider structuring a height adjusting device which is provided at the center pillar. The through anchor 10 is thereby mounted to the vehicle.

An insert-through plate portion 18, which is formed in a substantially rectangular shape and which, together with the base portion 14, forms the main body portion 12, is formed at the main body portion 12 at the lower side of the base portion 14. A through hole 20 is formed in the central portion of the insert-through plate portion 18. The through hole 20 is for forming a substantial insert-through hole 22 through which a webbing 21 (see FIG. 1), which is a webbing for restraining a vehicle occupant, is inserted.

A piece 24 is assembled to the longitudinal direction peripheral edge of the lower side of the through hole 20 of the main body portion 12. The piece 24 is formed of a synthetic resin material which is such that the friction resistance of a surface 25 of the piece 24 is lower than that of the covering portion 13. As shown in FIGS. 5A through 5C, the piece 24 is formed on the whole in a substantially semicylindrical shape. A pair of anchor legs 26 are formed to project integrally from portions of the inner side of the piece 24. The anchor legs 26 are formed in substantially L-shaped configurations as seen in side view.

An extending portion 28, which is formed in the shape of a substantially U-shaped flat plate, is formed to project between the pair of anchor legs 26 at the longitudinal direction central portion of the inner side of the piece 24. An engaging groove 30 which is an engaging portion is formed from one end of the extending portion 28 (the lower side end portion in FIG. 5B) to the central portion thereof. The engaging groove 30 engages with a convex portion 32 which is formed to project from the surface of the bottom end portion of the insert-through plate portion 18 of the main body portion 12.

The piece 24 is assembled to the longitudinal direction peripheral edge of the lower side of the through hole 20 of the main body portion 12 due to the anchor legs 26 being anchored on the bottom end of the insert-through plate portion 18 of the main body portion 12. Further, the piece 24 is positioned at the main body portion 12 due to the engaging groove 30 of the extending portion 28 engaging with the convex portion 32 of the insert-through plate portion 18. In this state, the covering portion 13 is, together with the piece 24, integrally molded to the periphery of the through hole 20.

Figure 6A:
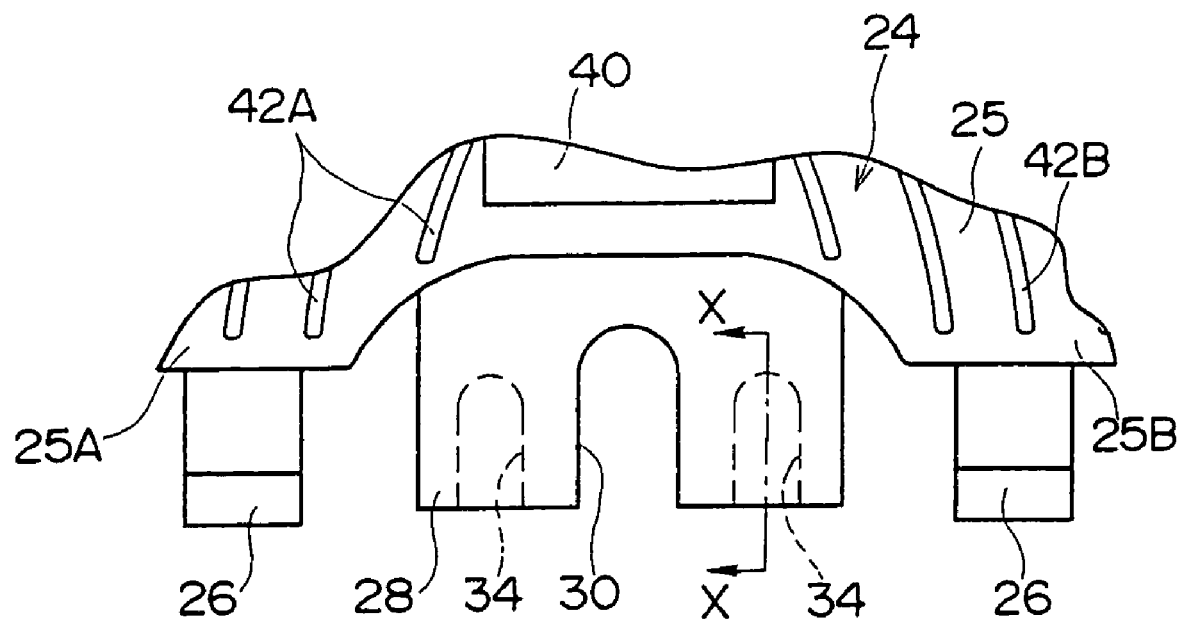
FIG. 6A is a front view showing the structure of an engaging portion at the piece of the through anchor relating to the embodiment of the present invention.
Figure 6B:
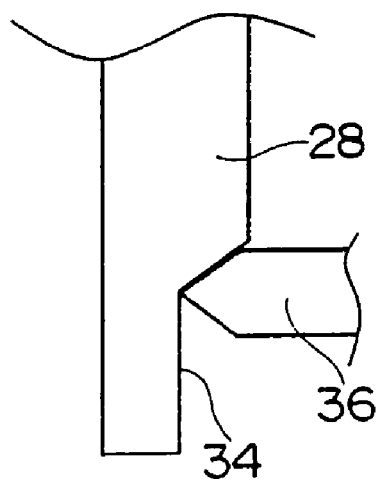
FIG. 6B is a sectional view, taken along line X—X of FIG. 6A, showing the structure of a positioning portion at the piece of the through anchor relating to the embodiment of the present invention.

Note that, as shown in FIG. 6A, positioning grooves 34 which are positioning portions are formed in the surface of the extending portion 28 of the piece 24. At the time when the main body portion 12 (the piece 24) is attached to a mold for molding in the state in which the piece 24 is assembled to (held at) the main body portion 12, and molding is carried out, as shown in FIG. 6B, positioning at the time of attaching the main body portion 12 to the mold can be carried out by making the positioning grooves 34 engage with eject pins 36 or the like of the mold.

On the other hand, as shown in FIG. 1, the substantial insert-through hole 22, through which the webbing 21 is inserted, is formed by the covering portion 13 and the piece 24 which are integrally molded to the periphery of the through hole 20. The webbing 21 is substantially trained about the surface 25 of the piece 24.

As shown in FIGS. 5A and 5B, a concave portion 40 is formed in the central portion in the longitudinal direction of the surface 25 of the piece 24. The surface of the concave portion 40 is formed to be smooth. As shown in FIG. 1, the concave portion 40 is formed at a region corresponding to the width direction central portion of the webbing 21 which is trained on the surface 25 of the piece 24.

Plural stripe-like grooves 42A and grooves 42B, which are formed from one widthwise direction end of the piece 24 to the other widthwise direction end (i.e., from top to bottom in FIG. 5A), are provided in a surface 25A and a surface 25B, which are at the both sides of the concave portion 40, of the surface 25 of the piece 24. The grooves 42A and the grooves 42B are formed so as to be lined up at regular intervals along the longitudinal direction of the piece 24. The grooves 42A and the grooves 42B are symmetrical across a central line A, and are bent at a predetermined angle at the central line A so as to be formed in substantial V shapes as seen in the top view shown in FIG. 5A. Further, the grooves 42A and the grooves 42B are formed so as to be symmetrical to each other across a central line B (the concave portion 40). Namely, at each of the grooves 42A, the position of the groove 42A on the central line A is the vertex, and the region of the groove 42A above the central line A and the region of the groove 42A below the central line A are both inclined toward the left. On the other hand, at each of the grooves 42B, the position of the groove 42B on the central line A is the vertex, and the region of the groove 42B above the central line A and the region of the groove 42B below the central line A are both inclined toward the right. (Here, the top, bottom, left, right directions are the directions based on FIG. 5A.) In the top view shown in FIG. 5A, the grooves 42A and the grooves 42B are formed by straight lines. On the other hand, in the front view shown in FIG. 5B, the grooves 42A and the grooves 42B are formed by smooth curves.

Here, for example, let us suppose a state in which the through anchor 10 is mounted to the center pillar or the like which is next to the seat on the right side of a vehicle and the vehicle occupant seated in that seat has applied the webbing 21 to himself/herself. When the webbing retractor locks the pulling-out of the webbing and inertia toward the front of the vehicle is applied to the vehicle occupant at the time when the vehicle rapidly decelerates, the webbing 21 slides in a state of being strongly fit tightly to the region of the surface 25 of the piece 24 which region is at the vehicle front side and the vehicle compartment inner side (the vehicle occupant side) (i.e., in FIG. 5A, the region of the surface 25A at the lower side of the central line A). The configurations of the grooves 42A on the surface 25A are formed, as seen in the front views shown in FIGS. 1 and 5B, so as to run along the direction in which the webbing 21 is applied to the vehicle occupant and so as to smoothly curve toward the rear of the vehicle.

Note that, in a state in which, for example, the through anchor 10 is mounted to the center pillar or the like which is next to the seat on the left side of the vehicle and the vehicle occupant seated in that seat has applied the webbing 21 to himself/herself, when the webbing retractor locks the pulling-out of the webbing and inertia toward the front of the vehicle is applied to the vehicle occupant at the time when the vehicle rapidly decelerates, the webbing 21 slides in a state of being strongly fit tightly to the region of the surface 25 of the piece 24 which region is at the vehicle front side and the vehicle compartment inner side (i.e., in FIG. 5A, the region of the surface 25B at the lower side of the central line A). The configurations of the grooves 42B at the surface 25B are formed, as seen in the front views shown in FIGS. 1 and 5B, so as to run along the sliding direction of the webbing 21 and so as to smoothly curve toward the rear of the vehicle.

Next, operation of the present embodiment will be described.

At the through anchor 10 having the above-described structure, the piece 24 is assembled to the peripheral edge of the through hole 20 formed in the metal main body portion 12, and structures a portion of the insert-through hole 22. The resin covering portion 13 is, together with the piece 24, molded integrally to the periphery of the through hole 20 of the main body portion 12. By attaching the through anchor 10 to a center pillar of a vehicle or to a height adjusting device provided at a center pillar, the longitudinal direction intermediate portion of the webbing 21, which is inserted through the through hole 20 (the insert-through hole 22) of the main body portion 12, is trained on and supported at the surface 25 of the piece 24.

Accordingly, when the webbing 21 is pulled-out or taken-up, the webbing 21 slides along the surface 25 of the piece 24 whose coefficient of friction is lower than that of the covering portion 13. Therefore, the pulling-out or taking-up of the webbing 21 can be carried out smoothly.

Note that, in the present embodiment, it is supposed that the through anchor 10 is mounted to, for example, the center pillar at the side of the driver's seat of a right hand drive vehicle (i.e., is mounted to the center pillar on the side of the front, right seat of the vehicle).

The plural grooves 42 are formed in the surface 25 of the piece 24. Therefore, for example, when inertia directed toward the front of the vehicle is applied to the body of the vehicle occupant in the state in which the vehicle rapidly decelerates and pulling-out of the webbing 21 is locked by the webbing retractor, the webbing 21 trained around the surface 25 of the piece 24 slides in a state of being strongly fit tightly to the plural grooves 42 of the surface 25 (in particular, the grooves 42A at the vehicle compartment inner side of the surface 25A). Therefore, the sliding direction of the webbing 21 is restricted (guided) by the plural grooves 42 of the surface 25 (in particular, the grooves 42A at the vehicle compartment inner side of the surface 25A).

In the conventional art, for example, as in the case of a through anchor 100 shown in FIG. 7B, grooves 106 of a surface 104 of a piece 102 are formed to be rectilinear as seen in front view. Therefore, when the vehicle rapidly decelerates, a component of force F1 directed toward the front of the vehicle, of a force F which the webbing 21 receives from the grooves 106 of the piece 102, is applied such that the webbing 21 slips laterally toward the front of the vehicle. (F2 in FIG. 7B is the component of force, directed toward the lower side of the vehicle, of F.) Accordingly, at the conventional through anchor 100, there are cases in which the webbing 21 slips laterally within the insert-through hole 22 and moves toward and becomes stuck at the vehicle front side end of the insert-through hole 22, such that so-called jamming cannot be reliably suppressed.

In contrast, in the through anchor 10 relating to the present embodiment, as shown in FIG. 7A, the configurations of the grooves 42A at the region of the surface 25 of the piece 24, which is the region where the webbing 21 particularly strongly fits tightly to and slides when the vehicle rapidly decelerates (i.e., at the region of the surface 25A at the lower side of the central line A in FIG. 5A), are formed so as to run along the direction in which the webbing 21 is applied to the vehicle occupant (the driver in the present embodiment) and so as to smoothly curve toward the rear of the vehicle. Therefore, the webbing 21, which slides in a state of being strongly fit tightly to the grooves 42A of the surface 25A, slides while the sliding direction thereof is pulled-back (i.e., is corrected) toward the rear of the vehicle.

Namely, the through anchor 10 is structured such that, as shown in FIG. 7A, only a slight amount of the component of force F1 directed toward the front of the vehicle, of the force F which the webbing 21 receives from the grooves 42A of the surface 25A of the piece 24, is generated. In this way, lateral slipping, toward the front of the vehicle, of the webbing 21 within the insert-through hole 22 when the vehicle rapidly decelerates is reliably prevented. (The component of force F2, toward the bottom of the vehicle, of F is substantially equal to F.) Further, the concave portion 40 is formed in the central portion in the longitudinal direction of the piece 24. Therefore, when tension is applied to the webbing 21 when the vehicle rapidly decelerates, the surface pressure of the webbing 21 on the surface 25 of the piece 24 is high, and the ability of the webbing 21 to fit tightly to the grooves 42A (or the grooves 42B) is good (the clinging of the webbing 21 to the grooves 42A (or the grooves 42B) is good). Lateral slipping of the webbing 21 within the insert-through hole 22 can thereby be prevented even more reliably.

In this way, in the through anchor 10 having the above-described structure, jamming can be reliably prevented while good slidability of the webbing 21 is ensured.

The grooves 42A and the grooves 42B of the piece 24 are formed so as to be symmetrical at the both sides of the concave portion 40 (i.e., at the both sides of the central line B in FIG. 5A). Therefore, there is no directionality when fixing the through anchor 10 to the interior of the vehicle, and common usage of parts can be attained.

In the state in which the piece 24 is assembled to the main body portion 12, the engaging groove 30 of the extending portion 28 of the piece 24 and the convex portion 32 of the main body portion 12 are engaged together. Therefore, at the time of manufacturing the through anchor 10, the occurrence of joggling of the piece 24, which is assembled to the main body portion 12, with respect to the main body portion 12 is prevented. In this way, the molding precision, at the time of integrally molding the covering portion 13 in the state in which the piece 24 is assembled to the main body portion 12, improves.

The positioning grooves 34 are formed in the extending portion 28 of the piece 24. At the time of molding the covering portion 13, the positioning grooves 34 engage with the eject pins 36 of the mold. Therefore, when the piece 24 is assembled to the main body portion 12, and the main body portion 12 is attached to a predetermined position of the mold, and the covering portion 13 is molded, positional offset of the piece 24 (the main body portion 12) with respect to the mold can be prevented. Accordingly, the molding accuracy of the through anchor 10 is improved.

In the above-described embodiment, the piece 24 of the through anchor 10 is formed of a synthetic resin. However, the present invention is not limited to the same, and the piece 24 may be formed of metal.

In the above-described embodiment, the through anchor 10 is attached to the center pillar at the side of the driver's seat in a right hand drive vehicle (i.e., is mounted to the center pillar at the side of the front, right seat of the vehicle). However, the present invention is not limited to the same. In a case in which the through anchor 10 is fixed to the interior of the vehicle compartment (e.g., the center pillar or the like) at the side of a seat on the left side of the vehicle (e.g., at the side of the front passenger's seat in a right hand drive vehicle, or the like), at the time when the vehicle rapidly decelerates, the direction of sliding of the webbing 21 is restricted by the grooves 42B at the vehicle compartment inner side region of the surface 25B of the piece 24.

Next, modified examples of the piece 24 of the through anchor 10 will be described.

(First Modified Example)

Figure 8A:
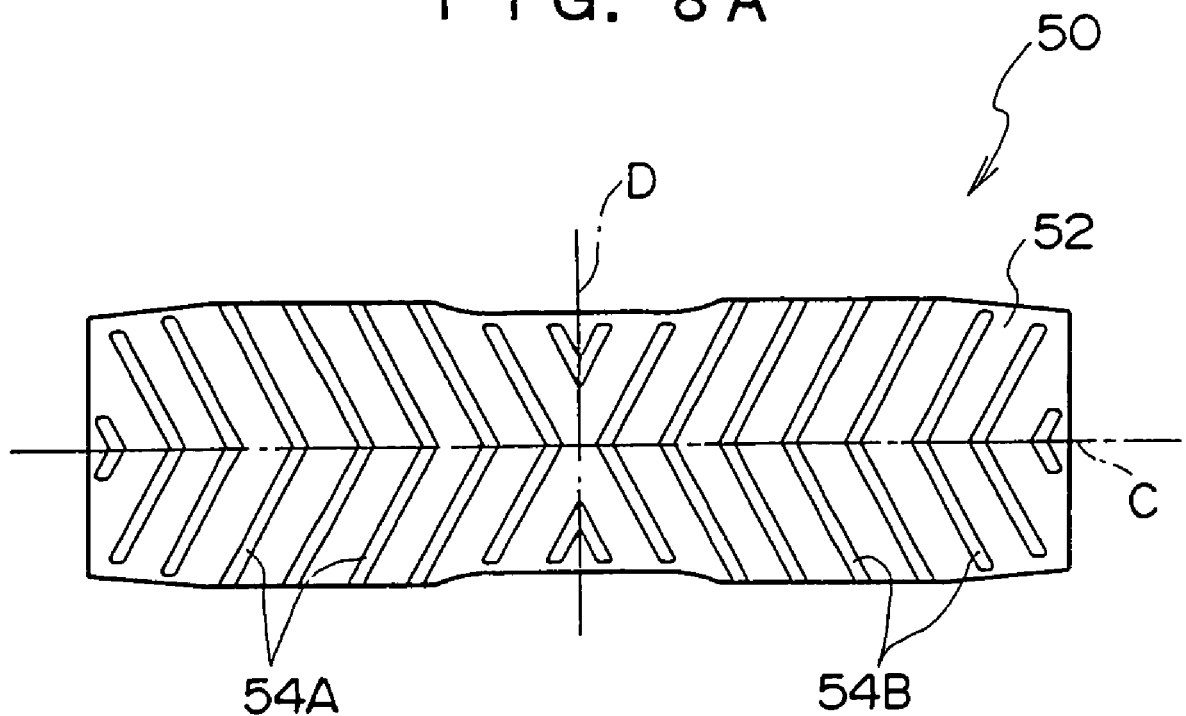
FIG. 8A is a top view showing a first modified example of the piece of the through anchor relating to the embodiment of the present invention.
Figure 8B:
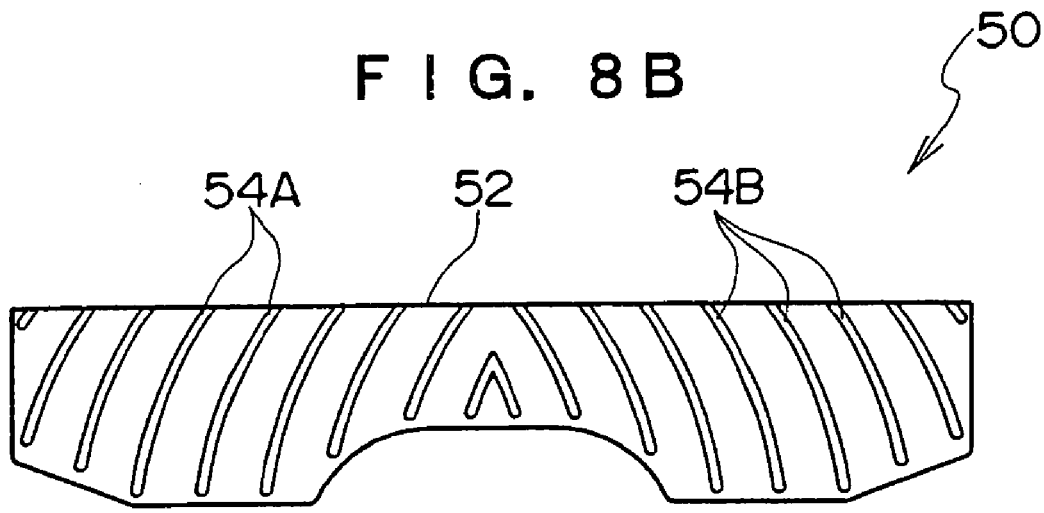
FIG. 8B is a front view showing the first modified example of the piece of the through anchor relating to the embodiment of the present invention.

A first modified example shown in FIGS. 8A and 8B is structured such that the concave portion 40 at the piece 24 of the through anchor 10 of the above-described embodiment does not exist at a surface 52 of a piece 50. The configurations of the grooves are basically structured the same as at the piece 24. Namely, grooves 54A and grooves 54B are formed in the surface 52 of the piece 50. The grooves 54A and 54B are symmetrical across a central line C, and are inclined at predetermined angles from the central line C. Further, the grooves 54A and the grooves 54B are formed so as to be symmetrical across a central line D.

In the top view shown in FIG. 8A, the grooves 54 are rectilinear. In the front view shown in FIG. 8B, the groves 54 are curved. The configurations of the grooves 54 at the region disposed at the vehicle front side and at the vehicle compartment inner side (in FIG. 8A, the region on the left side of the central line D and beneath the central line C) run along the direction in which the webbing is applied to the vehicle occupant and are formed so as to smoothly curve toward the rear of the vehicle. A structure such as the piece 50 also can achieve effects which are basically the same as those of the piece 24 of the through anchor 10 of the above-described embodiment.

(Second Modified Example)

In a second modified example shown in FIGS. 9A and 9B, plural stripe-like grooves 64, which are formed in a surface 62 of a piece 60 from one width direction end of the piece 60 to the other width direction end thereof (i.e., from top to bottom in FIG. 9A), are provided so as to be lined up at regular intervals. The grooves 64 are respectively inclined at a predetermined angle with respect to the width direction of the piece 60. In FIG. 9A, the grooves 64 are asymmetrical above and beneath a central line E.

In the top view shown in FIG. 9A, the grooves 64 are rectilinear. In the front view shown in FIG. 9B, the groves 64 are curved. The configurations of the grooves 64 at the region located at the vehicle compartment inner side (in FIG. 9A, the region beneath the central line E) run along the direction in which the webbing is applied to the vehicle occupant and are formed so as to smoothly curve toward the rear of the vehicle. When using a structure such as the piece 60, there is the need to reverse the direction of inclination of the grooves 64 with respect to the piece 60 in a case in which the piece 60 is disposed at the side of a right side seat of the vehicle and in a case in which the piece 60 is disposed at the side of a left side seat of the vehicle. However, the piece 60 can achieve effects which are basically the same as those of the piece 24 of the above-described through anchor 10.

(Third Modified Example)

Figure 10A:
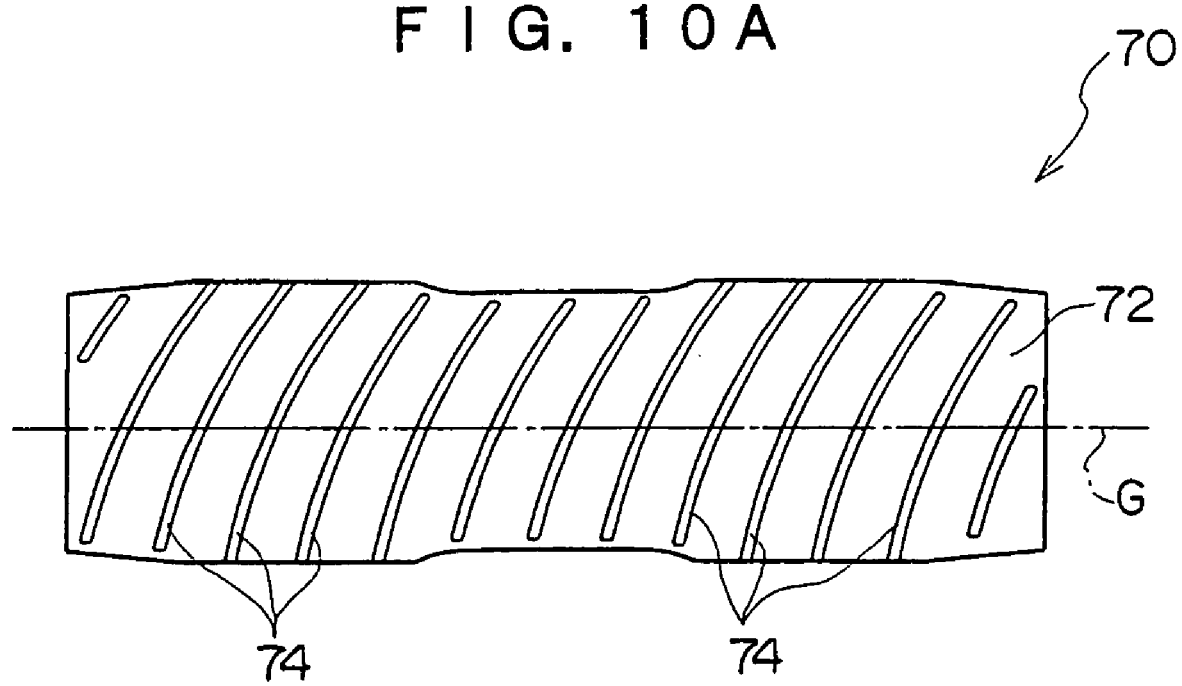
FIG. 10A is a top view showing a third modified example of the piece of the through anchor relating to the embodiment of the present invention.
Figure 10B:
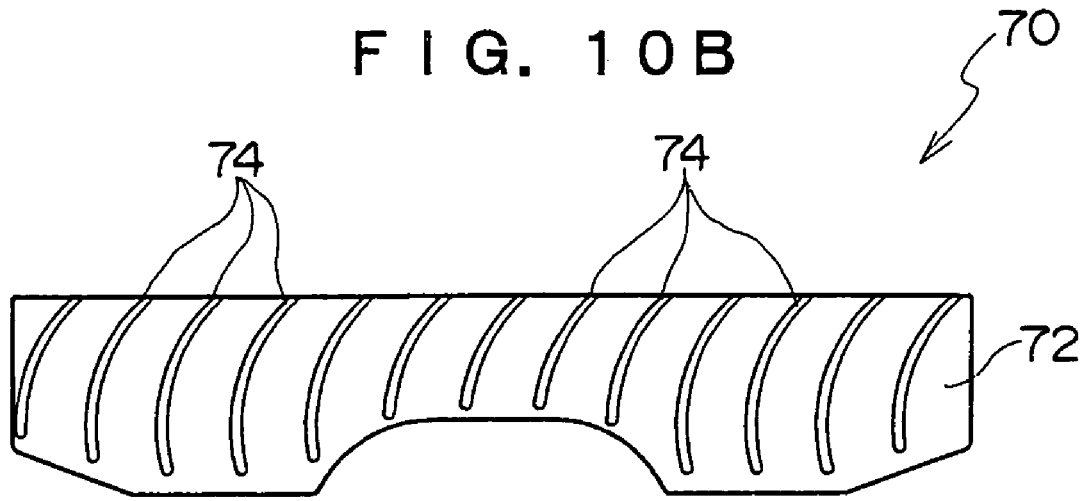
FIG. 10B is a front view showing the third modified example of the piece of the through anchor relating to the embodiment of the present invention.

In a third modified example shown in FIGS. 10A and 10B, plural stripe-like grooves 74, which are formed in a surface 72 of a piece 70 from one width direction end of the piece 70 to the other width direction end thereof (i.e., from top to bottom in FIG. 10A), are provided so as to be lined up at regular intervals. The grooves 74 are respectively inclined at a predetermined angle with respect to the width direction of the piece 70. In FIG. 10A, the grooves 74 are asymmetrical above and beneath a central line G.

In the top view shown in FIG. 10A and in the front view shown in FIG. 10B, the groves 74 are curved. The configurations of the grooves 74 at the region located at the vehicle compartment inner side (in FIG. 10A, the region beneath the central line G) run along the direction in which the webbing is applied to the vehicle occupant and are formed so as to smoothly curve toward the rear of the vehicle. In the same way as with the piece 60 of the above-described second modified example, when using a structure such as the piece 70, there is the need to reverse the direction of inclination of the grooves 74 with respect to the piece 70 in a case in which the piece 70 is disposed at the side of a right side seat of the vehicle and in a case in which the piece 70 is disposed at the side of a left side seat of the vehicle. However, the piece 70 can achieve effects which are basically the same as those of the piece 24 of the above-described through anchor 10.

(Fourth Modified Example)

Figure 11A:
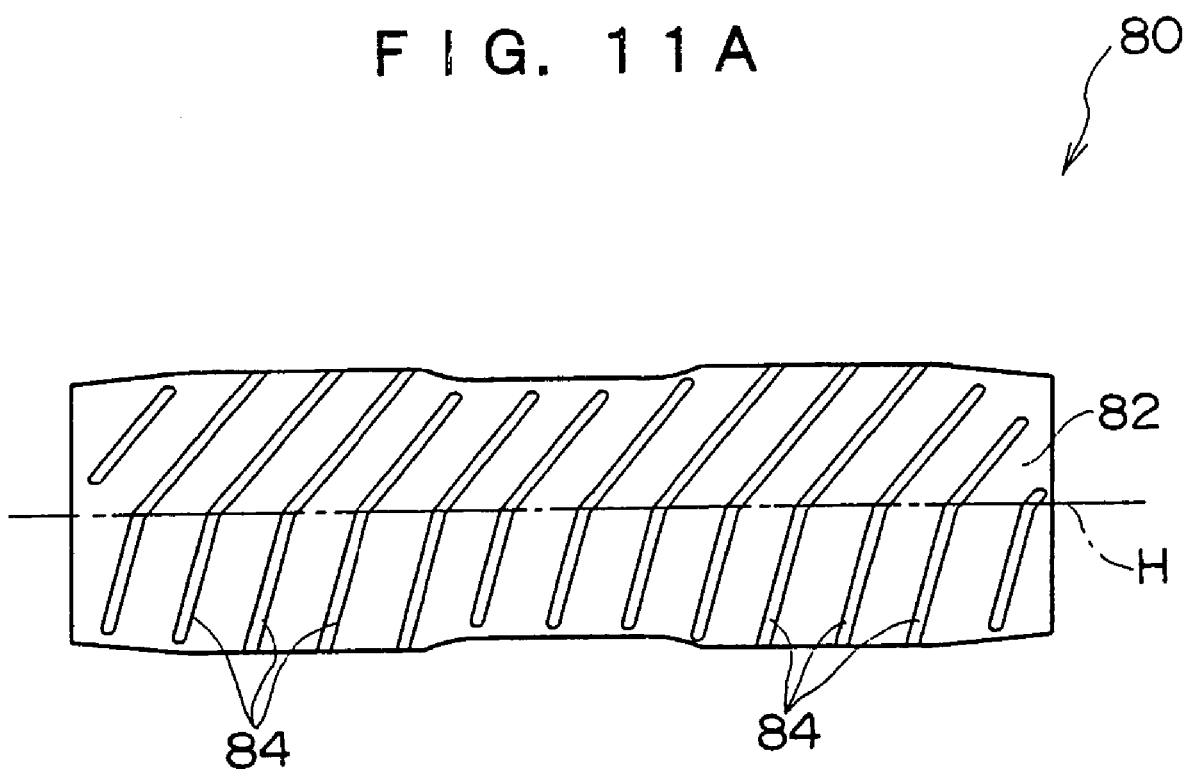
FIG. 11A is a top view showing a fourth modified example of the piece of the through anchor relating to the embodiment of the present invention.
Figure 11B:
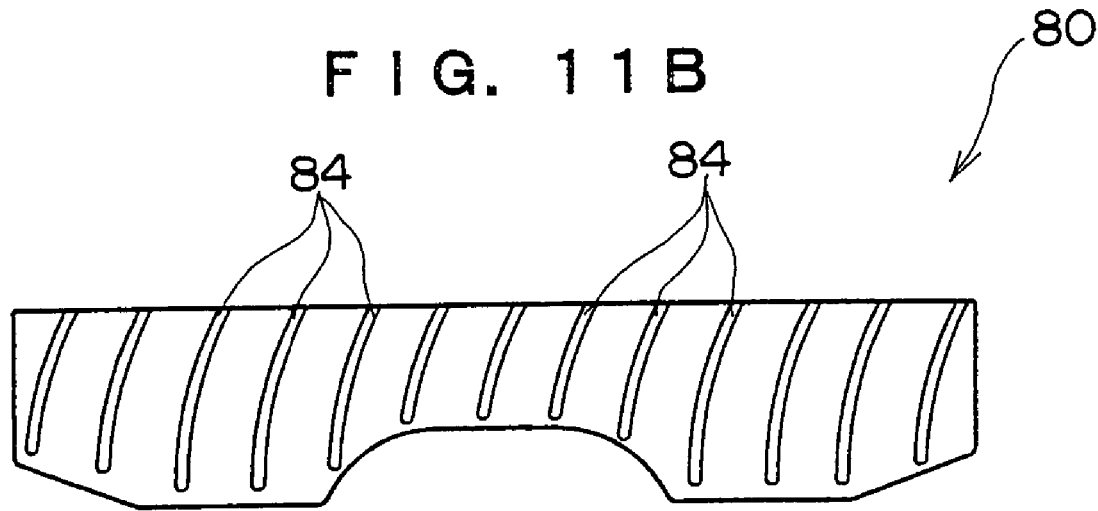

In a fourth modified example shown in FIGS. 11A and 11B, plural stripe-like grooves 84, which are formed in a surface 82 of a piece 80 from one width direction end of the piece 80 to the other width direction end thereof (i.e., from top to bottom in FIG. 11A), are provided so as to be lined up at regular intervals. The grooves 84 are respectively inclined with respect to the width direction of the piece 80, and the angle of inclination changes at a central line H (the grooves 84 are bent at the central line H).

In the top view shown in FIG. 11A, the grooves 84 are rectilinear. In the front view shown in FIG. 11B, the groves 84 are curved. The regions of the grooves 84 above the central line H in FIG. 11A are inclined along the direction of placement of the webbing retractor. On the other hand, the regions of the grooves 84 beneath the central line H in FIG. 11A run along the direction in which the webbing is applied to the vehicle occupant and are formed so as to smoothly curve toward the rear of the vehicle. A structure such as the piece 80 is particularly effective in cases in which so-called "force limiters", "pretensioners" or the like are used in webbing retractors and the like.

(Fifth Modified Example)

Figure 12A:
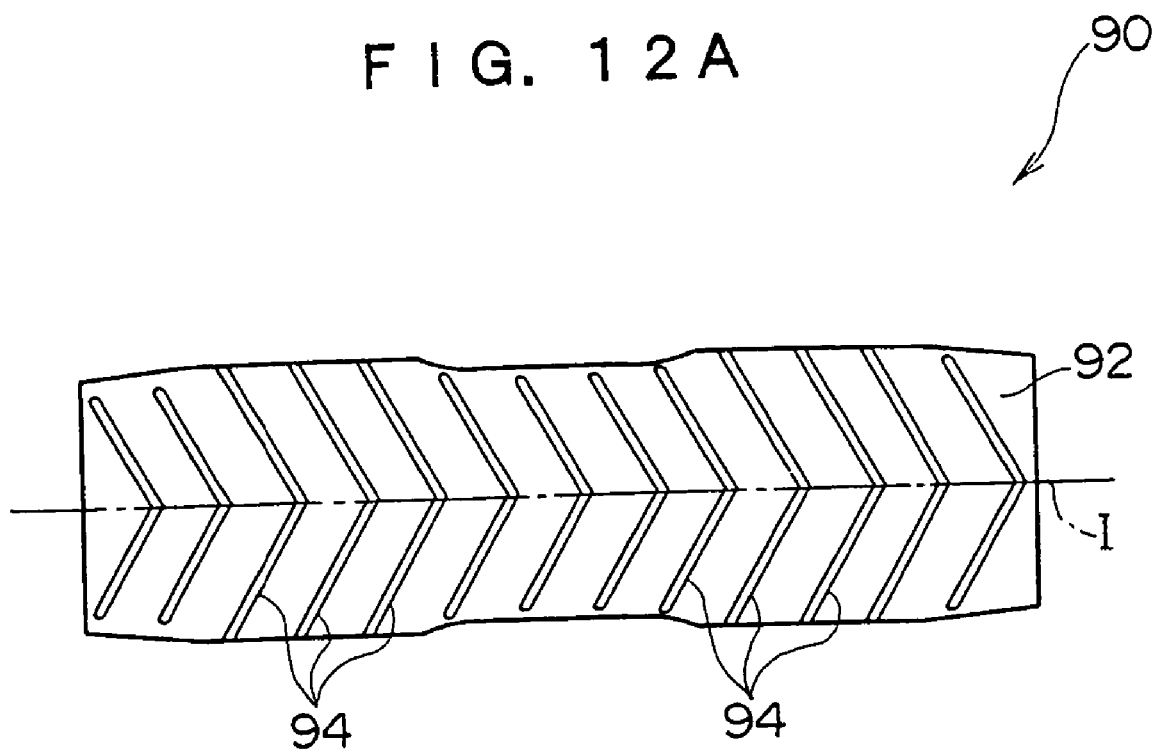
FIG. 12A is a top view showing a fifth modified example of the piece of the through anchor relating to the embodiment of the present invention.
Figure 12B:
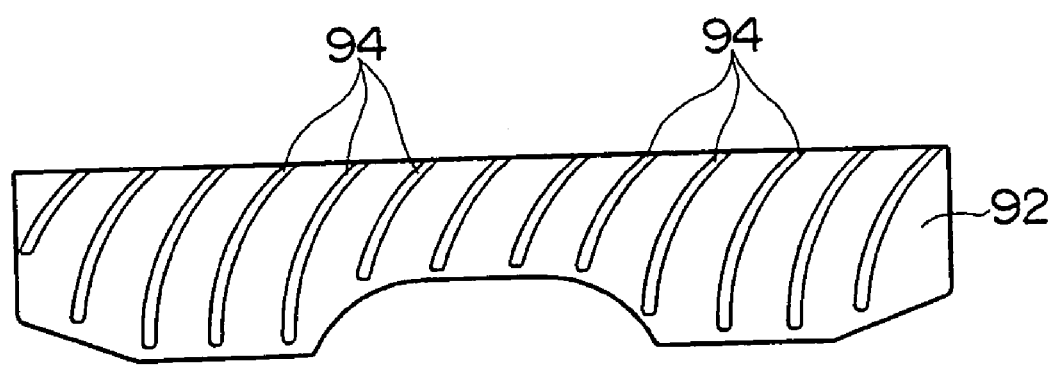
FIG. 12B is a front view showing the fifth modified example of the piece of the through anchor relating to the embodiment of the present invention.

In a fifth modified example shown in FIGS. 12A and 12B, plural stripe-like grooves 94, which are formed in a surface 92 of a piece 90 from one width direction end of the piece 90 to the other width direction end thereof (i.e., from top to bottom in FIG. 12A), are provided so as to be lined up at regular intervals. The grooves 94 are formed in substantial V shapes which are bent at a central line I. In FIG. 12A, the region of the groove 94 above the central line I and the region of the groove 94 below the central line I are inclined toward the left, with the position of the central line I being the vertex of the groove 94.

In the top view shown in FIG. 12A, the grooves 94 are rectilinear. In the front view shown in FIG. 12B, the groves 94 are curved. The configurations of the grooves 94 at the region disposed at the vehicle compartment inner side (in FIG. 12A, the region beneath the central line I) run along the direction in which the webbing is applied to the vehicle occupant and are formed so as to smoothly curve toward the rear of the vehicle. When using a structure such as the piece 90, there is the need to reverse the direction of inclination of the grooves 94 with respect to the piece 90 in a case in which the piece 90 is disposed at the side of a right side seat of the vehicle and in a case in which the piece 90 is disposed at the side of a left side seat of the vehicle. However, the piece 90 can achieve effects which are basically the same as those of the piece 24 of the above-described through anchor 10.

Note that the pieces 50, 60, 70, 80 and 90 in the above-described first through fifth modified examples may be formed of synthetic resin or may be formed of metal.

As described above, in accordance with the through anchor of the present invention, jamming can be reliably prevented while good slidability of the webbing is ensured.

Note that, in the through anchor of the present invention, it is preferable that the piece have, at a region of the surface thereof corresponding to the central portion of the webbing in the width direction, a concave portion whose surface is smooth.

In the above-described through anchor, the concave portion whose surface is smooth is formed in the surface of the piece having plural grooves, at a region corresponding to the central portion of the webbing in the width direction thereof. Therefore, when tension is applied to the webbing when the vehicle rapidly decelerates, the webbing fits tightly to the regions where the grooves are formed at both sides of the concave portion. Thus, the surface pressure of the webbing with respect to the surface of the piece is high, and the ability of the webbing to fit tightly to the grooves of the surface of the piece is good. In this way, it is possible to even more reliably prevent the webbing from slipping laterally within the insert-through hole when the vehicle rapidly decelerates.

Further, it is preferable that the through anchor of the present invention have a convex portion provided at the surface of the main body portion at the periphery of the insert-through hole, and an engaging portion which is provided at the piece and which engages with the convex portion of the main body portion when the piece is assembled to the main body portion.

At the above-described through anchor, the convex portion is provided at the surface of the main body portion at the periphery of the insert-through hole, and the engaging portion, which engages with the convex portion when the piece is assembled to the main body portion, is provided at the piece. Therefore, joggling of the piece, which is assembled to the main body portion, with respect to the main body portion is suppressed. In this way, the precision of molding at the time of integrally molding the covering portion in the state in which the piece is assembled to the main body portion is improved.

Further, in the through anchor of the present invention, it is preferable that the piece have a positioning portion which engages with an eject pin of a mold at the time when the covering portion is molded.

In this through anchor, a positioning portion is provided at the piece, and the positioning portion engages with an eject pin of a mold when the covering portion is molded. In this way, when the piece is assembled to the main body portion, and the main body portion is attached to a predetermined position of a mold, and the covering portion is molded, positional offset of the piece (the main body portion) with respect to the mold can be prevented. Therefore, the accuracy of molding the through anchor is improved.

What is claimed is:

1. A through anchor for supporting, at a vehicle, a webbing for restraining a vehicle occupant, the through anchor comprising:
   a main body portion which is formed of metal, and in which is formed an insert-through hole through which the webbing is inserted;
   a piece that is assembled to a peripheral edge of the insert-through hole of the main body portion and structuring a portion of the insert-through hole, a surface of the piece being a region around which the webbing is trained, and the piece having a plurality of grooves in the surface; and
   a covering portion that is molded, together with the piece, integrally at a periphery of the insert-through hole of the main body portion, and covering the periphery of the insert-through hole,
   wherein, among the plurality of grooves of the surface of the piece, at least the plurality of grooves at a region which is disposed at a front side of the vehicle and at an inner side of a vehicle compartment run along a direction of application of the webbing to a vehicle occupant and are formed in configurations which smoothly curve toward a rear of the vehicle, and
   wherein the piece has a positioning portion means for engaging with an eject pin of a mold at a time of molding the covering portion to avoid positional offset of the piece with respect to said mold.

2. The through anchor of claim 1, wherein the piece has a concave portion whose surface is smooth, at a region of the surface of the piece which region corresponds to a width direction central portion of the webbing.

3. The through anchor of claim 2, further comprising: a convex portion provided at a surface of the main body portion at the periphery of the insert-through hole; and
   an engaging portion provided at the piece, and engaging with the convex portion of the main body portion in a state in which the piece is assembled to the main body portion.

4. The through anchor of claim 1, further comprising:
   a convex portion provided at a surface of the main body portion at the periphery of the insert-through hole; and
   an engaging portion provided at the piece, and engaging with the convex portion of the main body portion in a state in which the piece is assembled to the main body portion.

5. The through anchor of claim 1, wherein the piece has an anchor portion at a portion of an inner side of the piece, and the piece is assembled to the main body portion by the anchor portion being anchored on a bottom end of the main body portion.

6. The through anchor of claim 1, wherein the piece is formed of resin.

7. The through anchor of claim 6, wherein the covering portion is formed of resin, and
   a coefficient of friction of the resin forming the piece is lower than a coefficient of friction of the resin forming the covering portion.

8. The through anchor of claim 1, wherein the piece is formed of metal.

9. The through anchor of claim 1, wherein curved configurations of the plurality of grooves are curved configurations which s-well extend toward a top of the vehicle.

10. The through anchor of claim 1, wherein the plurality of grooves are formed so as to have line symmetry with respect to a first central line which is positioned at a substantially central portion in a longitudinal direction of the piece and which extends so as to divide the piece in two in a longitudinal direction of the vehicle.

11. The through anchor of claim 1, wherein the plurality of grooves are formed at the surface of the piece so as to have line symmetry with respect to a second central line which extends in a longitudinal direction of the piece at a substantially central portion in a width direction of the piece and which divides the piece into a vehicle compartment inner side portion of the piece and a vehicle compartment outer side portion of the piece.

12. The through anchor of claim 1, wherein the plurality of grooves are formed so as to be asymmetrical across a second central line which extends in a longitudinal direction of the piece at a substantially central portion in a width direction of the piece and which divides the piece into a vehicle compartment inner side portion of the piece and a vehicle compartment outer side portion of the piece.

13. The through anchor of claim 1, wherein the plurality of grooves are shaped as stripes formed from one width direction end of the piece to another width direction end of the piece, and are formed so as to be lined up at regular intervals, and are inclined with respect to a width direction of the piece.

14. The through anchor of claim 13, wherein angles of inclination of the plurality of grooves change at a second central line which extends in a longitudinal direction of the piece at a substantially central portion in a width direction of the piece and which divides the piece into a vehicle compartment inner side portion of the piece and a vehicle compartment outer side portion of the piece.

15. The through anchor of claim 14, wherein the angles of inclination of the plurality of grooves disposed at the vehicle compartment inner side of the piece are angles of inclination along the direction of application of the webbing to a vehicle occupant, and the angles of inclination of the plurality of grooves disposed at the vehicle compartment outer side of the piece are angles of inclination along a direction in which a webbing retractor is disposed.

16. The through anchor of claim 1, wherein the plurality of grooves are rectilinear when the piece is viewed in top view, and are curved when the piece is viewed in front view.

17. The through anchor of claim 1, wherein said positioning portion means is located on a member that extends in a direction opposite from said surface of said piece.

18. The through anchor of claim 17, wherein said positioning portion means includes a groove disposed at an end of said member that extends in a direction opposite from said surface.

19. The through anchor of claim 18, wherein said positioning portion means includes a portion of said groove disposed orthogonally to a direction that said member extends away from said surface.

20. A through anchor for supporting, at a vehicle, a webbing for restraining a vehicle occupant, the through anchor comprising:
    a main body portion which is formed of metal, and in which is formed an insert-through hole through which the webbing is inserted;
    a piece that is assembled to a peripheral edge of the insert-through hole of the main body portion and structuring a portion of the insert-through hole, a surface of the piece being a region around which the webbing is trained, and the piece having a plurality of grooves in the surface; and
    a covering portion that is molded, together with the piece, integrally at a periphery of the insert-through hole of the main body portion, and covering the periphery of the insert-through hole,
    wherein, among the plurality of grooves of the surface of the piece, at least the plurality of grooves at a region which is disposed at a front side of the vehicle and at an inner side of a vehicle compartment run along a direction of application of the webbing to a vehicle occupant and are formed in configurations which smoothly curve toward a rear of the vehicle, and
    wherein the plurality of grooves are curved when the piece is viewed in top view, and are curved when the piece is viewed in front view.

21. A method of manufacturing a through anchor which is for supporting, at a vehicle, a webbing for restraining a vehicle occupant, the method comprising:
    fabricating a main body portion of a through anchor which is formed of metal and has a through hole;
    fabricating a piece having a surface around which the webbing is trained, and a member extending away from the surface that includes a positioning portion for engaging eject pins of a mold;
    forming a plurality of grooves, which run along a direction of application of the webbing to a vehicle occupant and which smoothly curve toward a rear of the vehicle, at least at a region of the surface of the piece which region is disposed at a front side of the vehicle and at an inner side of a vehicle compartment;
    assembling the piece to a peripheral edge of the through hole of the main body portion;
    molding a covering portion, together with the piece, integrally to a periphery of the through hole of the main body portion, the covering portion covering the periphery of the through hole, so as to form an insert-through hole through which the webbing is inserted,
    wherein at the time the covering portion is molded, the positioning portion engages eject pins of a mold to avoid positional offset of the piece during molding.

22. The method of manufacturing a through anchor of claim 21, wherein assembling the piece includes:
    anchoring an anchor portion, which is formed at a portion of an inner side of the piece, to a bottom end of the main body portion such that the piece structures a portion of the insert-through hole; and
    engaging a convex portion, which is provided at a surface of the main body portion at the periphery of the through hole, and an engaging portion, which is provided at the piece.

23. A through anchor for supporting, at a vehicle, a webbing for restraining a vehicle occupant, the through anchor comprising:
    a main body portion which is formed of metal, and in which is formed an insert-through hole through which the webbing is inserted;
    a piece that is assembled to a peripheral edge of the insert-through hole of the main body portion and structuring a portion of the insert-through hole, a surface of the piece being a region around which the webbing is trained, and the piece having a plurality of grooves in the surface; and
    a covering portion that is molded, together with the piece, integrally at a periphery of the insert-through hole of the main body portion, and covering the periphery of the insert-through hole,
    wherein all of the plurality of grooves of the surface of the piece run along a direction of application of the webbing to a vehicle occupant and are formed in configurations which smoothly curve toward a rear of the vehicle, and wherein, with respect to a top view of the surface of the piece and a horizontal axis disposed along a length of the vehicle along a midsection of the piece, the angle that the grooves on one side intersect the axis is different from the angle that the grooves on the other side intersect the axis such that the grooves on different sides of the piece are asymmetrical.

24. A through anchor for supporting, at a vehicle, a webbing for restraining a vehicle occupant, the through anchor comprising:
    a main body portion which is formed of metal, and in which is formed an insert-through hole through which the webbing is inserted;
    a piece that is assembled to a peripheral edge of the insert-through hole of the main body portion and structuring a portion of the insert-through hole, a surface of the piece being a region around which the webbing is trained, and the piece having a plurality of grooves in the surface; and a covering portion that is molded, together with the piece, integrally at a periphery of the insert-through hole of the main body portion, and covering the periphery of the insert-through hole, wherein all of the plurality of grooves of the surface on each side of the piece are substantially parallel when viewed in front view and run along a direction of application of the webbing to a vehicle occupant and are formed in configurations which smoothly curve toward a rear of the vehicle, and wherein, with respect to a top view of the surface of the piece and a horizontal axis disposed along a length of the vehicle along a midsection of the piece, the angle that the grooves on one side intersect the axis is the same as the angle that the grooves on the other side intersect the axis such that the grooves on different sides of the piece are substantially mirror symmetrical along said axis.

25. A through anchor for supporting, at a vehicle, a webbing for restraining a vehicle occupant, the through anchor comprising:

a main body portion which is formed of metal, and in which is formed an insert-through hole through which the webbing is inserted;

a piece that is assembled to a peripheral edge of the insert-through hole of the main body portion and structuring a portion of the insert-through hole, a surface of the piece being a region around which the webbing is trained, and the piece having a plurality of grooves in the surface, wherein all of said grooves are formed in configurations which smoothly curve toward a rear of the vehicle; and a covering portion that is molded, together with the piece, integrally at a periphery of the insert-through hole of the main body portion, and covering the periphery of the insert-through hole, wherein, among the plurality of grooves of the surface of the piece, all of the plurality of grooves at a region which is disposed at a front side of the vehicle and at an inner side of a vehicle compartment run along a direction of application of the webbing to a vehicle occupant, and wherein the plurality of grooves at a region which is disposed at a back side of the vehicle are substantially mirror symmetrical with respect to said plurality of grooves at said region disposed at a front side of the vehicle along a vertical axis disposed in a middle portion of said piece.

* * * * *